United States Patent [19]

Nath et al.

[11] Patent Number: 4,766,024
[45] Date of Patent: Aug. 23, 1988

[54] ROOFING SYSTEM

[75] Inventors: Narikottile G. Nath, Carson, Calif.; Kenneth N. Meehan, Wheaton, Ill.; Robert W. Eberle, Golden, Colo.

[73] Assignee: International Permalite, Inc., Ontario, Calif.

[21] Appl. No.: 860,439

[22] Filed: May 7, 1986

[51] Int. Cl.⁴ .............................................. B32B 3/10
[52] U.S. Cl. .................................... 428/139; 428/158; 428/489
[58] Field of Search ............... 428/71, 158, 172, 489, 428/139

[56] References Cited

U.S. PATENT DOCUMENTS

| | | | |
|---|---|---|---|
| 1,788,121 | 1/1931 | Overbury . | |
| 2,507,629 | 5/1950 | Gallagher | 106/282 |
| 2,524,644 | 10/1950 | Wentland | 106/282 |
| 2,555,401 | 6/1951 | Fasold et al. | 117/92 |
| 2,610,928 | 9/1952 | Greider et al. | 117/168 |
| 2,626,864 | 1/1953 | Miscall | 92/3 |
| 2,626,872 | 1/1953 | Miscall | 106/122 |
| 2,634,207 | 4/1953 | Miscall | 92/3 |
| 2,634,208 | 4/1953 | Miscall | 92/3 |
| 2,640,786 | 6/1953 | Parsons | 106/282 |
| 2,782,129 | 2/1957 | Donegan | 117/30 |
| 2,878,131 | 3/1959 | Houston | 106/62 |
| 2,890,967 | 6/1959 | Holberg et al. | 106/278 |
| 2,893,889 | 7/1959 | Schuetz et al. | 117/30 |
| 2,902,379 | 9/1959 | McCollum | 106/99 |
| 2,939,794 | 6/1960 | Wilkinson | 106/15 |
| 3,042,578 | 7/1962 | Denning | 162/171 |
| 3,342,614 | 9/1967 | Koons | 106/15 |
| 3,457,136 | 7/1969 | Zaadnoordijk | 161/89 |
| 3,508,934 | 4/1970 | Ware | 106/15 |
| 3,617,329 | 11/1971 | Goff | 117/27 |
| 3,712,846 | 1/1973 | Daniels et al. . | |
| 3,886,076 | 5/1975 | Venable | 252/62 |
| 3,952,130 | 4/1976 | Nason . | |
| 3,991,848 | 11/1976 | Davis . | |
| 3,996,401 | 12/1976 | Van Nechel | 428/101 |
| 4,004,774 | 1/1977 | Houston | 428/139 X |
| 4,042,406 | 8/1977 | Gray . | |
| 4,160,491 | 7/1979 | Matsumoto et al. | 181/284 |
| 4,298,554 | 11/1981 | Vogel et al. | 264/25 |
| 4,313,997 | 2/1982 | Ruff et al. | 428/220 |
| 4,374,687 | 2/1983 | Yamamoto | 428/489 X |
| 4,446,040 | 5/1984 | Samanta | 252/62 |
| 4,518,431 | 5/1985 | Duvier, Jr. | 106/97 |
| 4,617,221 | 10/1986 | Chys | 428/489 X |

Primary Examiner—Alexander S. Thomas
Attorney, Agent, or Firm—Knobbe, Martens, Olson & Bear

[57] ABSTRACT

An expanded perlite board insulating system is provided. A planar surface of the perlite board is provided with an integrally attached scorch-resistant layer, and the planar surface is likewise provided with a plurality of surface perforations. An improved bitumen membrane having chopped fibers incorporated in the previously used modified bitumen product is then attached to the planar surface of the perlite board in the conventional manner. Upon being heated by the propane torch, the improved bitumen membrane partially melts and the bitumen material flows into the surface perforations to thereafter harden into plugs. The scorch-resistant layer protects the perlite board during this torch installation process.

4 Claims, 2 Drawing Sheets

ROOFING SYSTEM

BACKGROUND OF THE INVENTION

1. Field of the Invention

The present invention relates to insulated roofing systems, and more particularly to such insulated systems as utilize perlite board with an outer sealing layer of an improved modified bitumen membrane.

2. Description of the Prior Art

Perlite is a volcanic glass, which, as an ore, consists primarily of silica (65–70% by weight), alumina (12–16% by weight), and, most importantly, 2 to 5% by weight trapped water. Rapid heating of the perlite ore to a point just prior to fusion causes the trapped, vaporized water to suddenly expand or puff out the softening perlite particles. A cellular expanded product of extremely low density is produced, and if the expansion is carefully controlled with respect to temperature and time, the expanding perlite forms sealed bubbles. Upon cooling, the air pressure within the bubble is reduced to subatmospheric, thus creating a partially evacuated air vessel—a notoriously poor heat conductor.

The low density, chemical inertness, and heat resistancy of expanded perlite makes perlite a valuable heat insulation material, with it frequently being used as weight aggregate in plaster and concrete. For example, in McCollum (U.S. Pat. No. 2,902,379), a perlite and asbestos agglomerate is taught, which in turn is added to a plaster or cement mixture to form the finished product. When used solely as an insulation material, very little load-bearing capacity is required, e.g., an admixture of perlite and various vegetable or ineral fibers as provided by Denning (U.S. Pat. No. 3,042,578) and a perlite, fiber, and a metallic phosphate binder as taught by Venable (U.S. Pat. No. 3,886,076). When greater strength is required of the perlite construction, admixtures of perlite and cement are provided such as in Gray (U.S. Pat. No. 4,042,406) and in Duvier, Jr. (U.S. Pat. No. 4,518,431) or admixtures of perlite with silicates as disclosed in Vogel, et al. (U.S. Pat. No. 4,298,554) and Samanta (U.S. Pat. No. 4,446,040).

As discussed in Ruff and Nath (U.S. Pat. No. 4,313,997), conventional perlite insulating board is made from an aqueous slurry of fibers, sizing, and expanded perlite. The slurry is thereafter formed into boards by a Fourdrinier process involving alternating sequences of suction and pressure, followed by a drying operation, typically in an oven. After being dried and cut into commercially-sized boards, the perlite board is ready for installation in a variety of construction applications. When used as a roofing insulation material, the perlite board is laid directly on and attached to a roof deck in a manner responsive to the local building code requirements. The principal design criteria with respect to its attachment to the roof relates to wind-uplift resistance. Weather-proofing is provided by applying an asphaltic or bitumen-based product to the upper, exposed surface of the perlite board. The conventional rubberized bitumen membrane available in the roofing industry is generally known as "modified bitumen membrane." The modification consists of reacting the bitumen with either Atactic Polypropylene (APP) or Styrene Butadiene Styrene (SBS) modifiers. Reference to "bitumen membrane" or "bitumen" will mean "modified bitumen" unless otherwise specified.

Attachment of the bitumen membrane is somewhat hampered by the poor peel-resistance of the perlite board. In order to provide a better bond between these two materials, ones that differ greatly in resilience and flex characteristics, an intermediate glass base sheet is placed between the perlite board and the bitumen outer layer. The glass base sheet is anchored to the perlite board either by mechanical fasteners or by an intermediate layer of hot asphalt, which is mopped onto the perlite board surface prior to laying down the base sheet. Attachment of the outer bitumen member then proceeds utilizing on-site portable propane torches to soften the bitumen layer contemporaneously with its placement on the glass base sheet.

Although the foregoing perlite/glass base sheet/bitumen construction performs adequately as an insulating roofing system, a number of advantages could be realized by eliminating the requirement for the base sheet. Not only does the base sheet add an additional materials cost and additional weight to the structural design considerations, but the added labor required to install the base sheet, including the hot asphalt coating process, considerably adds to the cost of roof installation. Despite the many advantages of eliminating the base sheet intermediary layer, its removal has proved impractical to date due to the structural weaknesses posed when combining only the perlite and bitumen elements.

The internal fiber network in perlite board does not provide significant internal resistance to shear and peeling stresses, a characteristic of most pressboard constructions. Thus, one of the functions of the glass base sheet is to reduce the tendency of the asphalt-bitumen sealing layer to peel back and separate from the perlite top surface. To the extent that this structural weakness of perlite has been addressed previously by a series of related Miscall, et al. patents, the solution has been to reinforce the perlite board by adding various materials to the perlite slurry during the manufacture of the pressboard. Such materials include: fibrous materials (U.S. Pat. No. 2,634,207), asphalt binders (U.S. Pat. No. 2,634,208), and asphalt-impregnated fibers (U.S. Pat. No. 2,626,864). The latter two asphalt compositions are said to greatly increase the wet strength of the perlite board, however the addition of the asphalt to the normal perlite board almost doubles the weight of the board, and its effect on peel strength, the important criteria in the roofing system, is not discussed.

A second problem that is posed by removal of the glass base sheet relates to heat damage or scorching of the perlite during installation of the outer asphalt layer. As described previously, the bitumen material is heated by a propane torch just as it is being pressed against the installed perlite board. The open flame will frequently also overheat or scorch the top surface of the perlite board, resulting in a further significant weakening of its peel-resistance. The previously available techniques for controlling flame damage in roofing insulation systems primarily addressed the inflammability of the asphalt. The majority of solutions in this area attempt to reduce the tendency of asphalt to burn and/or flow under heat by admixing various other constituents with the asphalt, such as finely divided mineral fibers in Greider, et al., (U.S. Pat. No. 2,610,928), glass filaments in Schuetz, et al., (U.S. Pat. No. 2,893,889), and halogenated or organic phosphate compounds in Koons (U.S. Pat. No. 3,342,614). In addition to these admixture approaches, Donegan (U.S. Pat. No. 2,782,129) provides a sandwich construction of unexpanded vermiculite between asphalt and asbestos layers. The vermiculite is added for its property of expanding under heat, which is intended to disrupt the flow of burning asphalt, and in this manner prevent the spread of the fire. As noted, none of these teachings relate to protection of the perlite board surface from overheating.

In addition to providing protection to the perlite board, the glass base sheet also provides structural backing to the outer bitumen layer. Without the base sheet, the adhesive quality of the bitumen layer to the perlite and the general resilience of the bitumen material to the normal stresses imposed on roofing insulation must all be structurally accomplished by the bitumen material. The reinforcing filler materials of Fasold, et al. (U.S. Pat. No. 2,555,401), such as slate flour or limestone dust are of little help in providing structural strength, and are added to inhibit the flow of asphalt should it overheat. Of more relevance, albeit in a roadway context, are the additions of various fibers in Gallagher (U.S. Pat. No. 2,507,629). In Zaadnoordijk (U.S. Pat. No. 3,457,136) reinforcing fibrous materials are added to the bitumen material, with the fibrillary products either loose (e.g. individual fibers) or woven or knitted products. The more densely woven fabrics are suggested for large scale uses such as roofing, however there is no discussion as to the effect of such woven fibers on the adhesion of the bitumen layer to the substrate.

SUMMARY OF THE INVENTION

The present invention has, as an underlying objective, the improvement in the presently utilized perlite board/glass base sheet insulation system by the removal of such base sheet from the system relying entirely on the perlite board and an improved modified bitumen top seal coating.

This goal is inventively achieved by providing a perlite board that, when installed, has an upper surface covered with a plurality of shallow holes or partial perforations that receive a portion of the molten, improved modified bitumen membrane upon its installation on the perlite board surface. The attachment of the improved bitumen membrane to the perlite board is further enhanced by the provision of reinforcing fibers in the improved modified bitumen composition, hence the term "improved." Once the improved membrane is attached to the perlite board surface, the additional fibers increase the tensile strength of the modified bitumen, making it more difficult to later break the plurality of improved modified bitumen plugs formed when the molten bitumen flows into the perlite board holes. Protection of the perlite board surface from scorch damage during bitumen installation is also contemplated under the present invention by the provision of a scorch-resistant coating on the perlite board during the manufacture thereof.

After the perlite slurry has been received by the screen or mat conveyor, a second slurry mixture consisting of the scorch-resistant material is applied to the top surface of the wet mat of perlite. The principal solid constituents of this very liquid second slurry may include mineral wool and clay, however other materials providing a scorch-resistant property may also be selected. Application of the second slurry to the perlite surface occurs prior to the suction and pressure dewatering steps of the traditional Fourdrinier manufacturing process.

The formation of the multiple shallow holes or perforations on the perlite board surface can thereafter occur, either before or after the heat-drying operation. Perforation density, i.e., the number of holes per a given surface area, and the angle at which the holes are made with respect to the perlite board surface may both vary.

Installation of the perforated and coated perlite board in a roofing system proceeds in a substantially traditional manner, with the perlite board first mechanically fastened to the roof deck support members using an improved screw and plate fastening system. Placement of the perlite board is accomplished in an orientation whereby the perforated and coated board surface is available to receive and be adhered to the improved modified bitumen membrane. As is the case with the present roofing system that makes use of the glass base sheet, the improved modified bitumen membrane is joined to the perlite board by being heated just prior to its pressure application against the perlite board surface. This process is traditionally carried out with open propane torches being directed at the improved modified bitumen layer as it is being joined with the perlite board. The actual application of the membrane to the board surface is accomplished just as the surface of the improved modified bitumen begins melting. Under the present roofing system, the liquefied improved modified bitumen then flows into the plurality of surface holes formed in the perlite board. Protection of the perlite board during this propane torch application is obtained through the insulating, scorch-resistant outer layer.

After cooling, the improved modified bitumen material that extends into the plurality of holes forms an array of reinforcement plugs that further serve to mechanically bond or join the two materials together. To additionally increase the integrity of this connection, the modified bitumen membrane has been further improved over the traditional formulation by the addition of reinforcing fibers. Thus, the increased tensile strength of the multiple individual, improved modified bitumen plugs reinforces the connection between the perlite board and the improved modified bitumen sealing layer, decreasing the likelihood that the sealing layer will separate from the perlite board due to wind or weather aging. The useful life of this roofing system is thereby greatly extended.

Various other objects, advantages, and features of the present invention will become readily apparent from the ensuing detailed description, and the novel features will be particularly pointed out in the appended claims.

BRIEF DESCRIPTION OF THE DRAWINGS

FIG. 3 is a perspective view of an improved modified bitumen membrane for use in accordance with the present invention;

FIG. 4 is a partial perspective view, with portions in section and portions removed, showing a roof insulation system of perlite board and improved modified bitumen membrane in accordance with the present invention;

FIG. 5 is an enlarged elevation view, in section, showing the interface attachment between the perlite board and the improved modified bitumen membrane in accordance with the present invention;

FIG. 6 is a partial perspective view, showing an attachment plate used to retain the perlite board on the underlying roof support grid in accordance with the present invention; and FIG. 7 is a partial perspective view showing the installation of the improved modified bitumen membrane on the previously installed perlite board in accordance with the present invention.

DESCRIPTION OF THE PREFFERED EMBODIMENT

Figure 1:
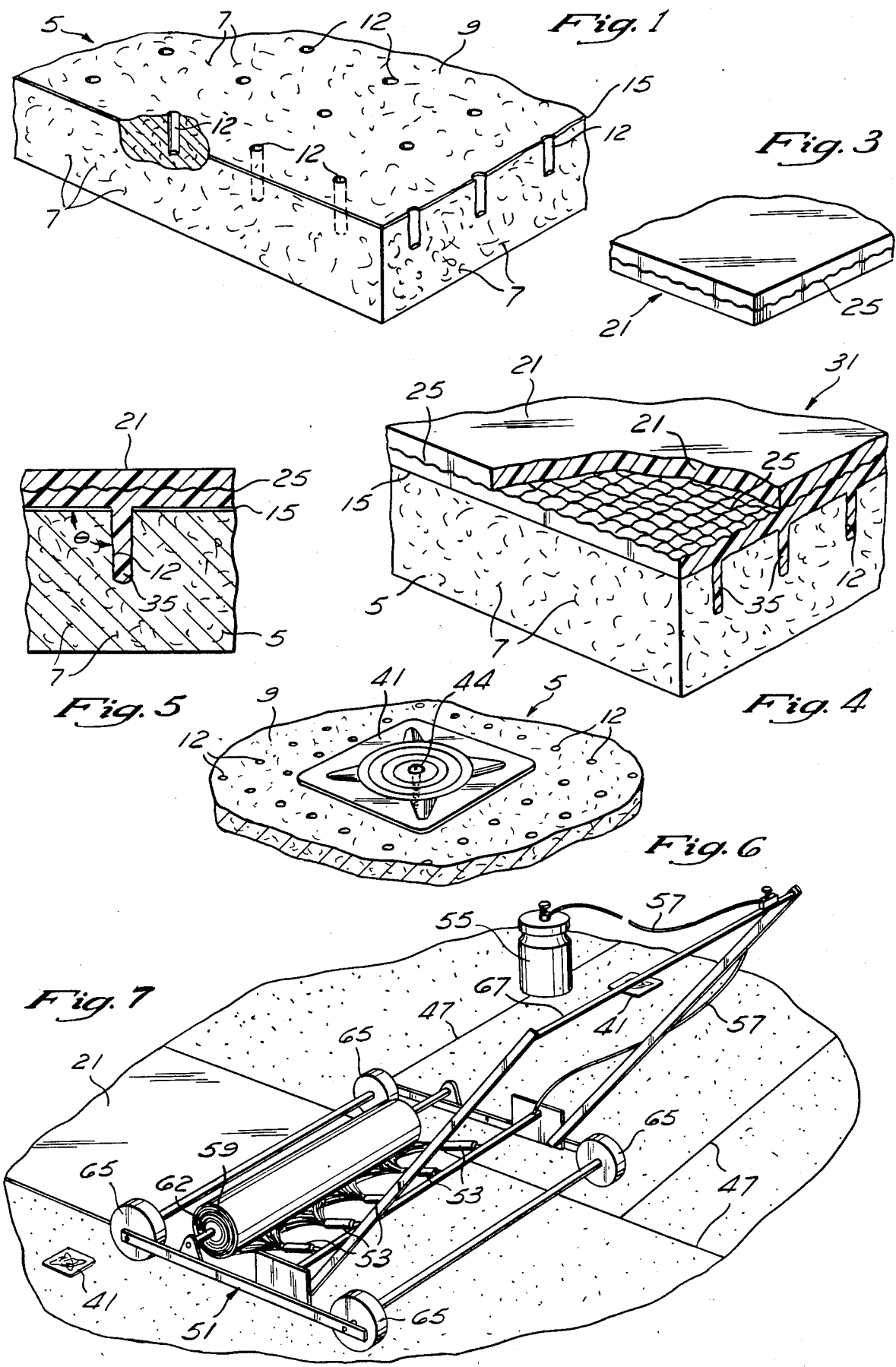
FIG. 1 is a partial perspective view, with a portion in section, showing a perlite insulation board in accordance with the present invention.

FIG. 1 shows a perlite board 5 of the type used to provide thermal insulation in commercial roofing systems. Although details of its manufacture will be discussed in greater detail in connection with FIG. 2, the perlite board 5 may be properly classified as a pressboard construction, having an agglomeration of randomly distributed fibers 7 functioning as a binder. In the preferred embodiment, an upper surface 9 of the perlite board 5 is provided with a plurality of surface perforations 12 that partially penetrate the perlite board 5. Depending upon their method of creation, the plurality of surface perforations 12 may be randomly located about the upper surface 9 or may, in the preferred embodiment, constitute regular arrays.

Traditional perlite boards have constituted a homogenous pressboard product, however under the present invention, a protective outer layer 15 is formed on the upper surface 9. Upon installation into the roofing system contemplated by the present invention, the protective outer layer 15 forms the attachment surface to which a sealing coating is applied when completing the roofing system. Likewise, in the preferred embodiment, the plurality of surface perforations 12 formed in the upper surface 9 penetrate the exposed, protective outer layer 15.

The insulated roofing system of the present invention is completed by the addition of an improved modified asphaltic or bitumen membrane 21 to be attached to and cover the upper surface 9 of the perlite board 5. The improved modified bitumen membrane 21 is of substantially uniform composition aside from a central membrane 25 provided for strength. The improved modified bitumen material may, in the preferred embodiment, consist of either a mixture of atactic polypropylene with a low-melting asphalt, such as undehydrogenated asphalt, or by mixing styrene-butadiene-styrene with the low melting asphalt. In addition, the preferred embodiment contemplates modifying the normal modified bitumen compound by incorporating chopped mineral fibers such as glass fibers or rock wool fibers, or organic chopped fibers such as polyester fibers, at a level ranging from approximately 0.25% by weight to 3.0% by weight. The chopped fibers should preferably vary in length from between 0.05 inch to 0.5 inch (1.3–13 mm). The central membrane 25 may preferably be constructed of a polyester scrim, having a thickness of approximately 0.04 inches (1 mm), with the overall thickness of the central membrane 25 on the order of 0.04–0.045 inches (1–1.15 mm).

An insulating system 31 according to the present invention is shown in FIG. 4, with the improved modified bitumen membrane 21 attached to and received by the upper surface 9 of the perlite board 5. As shown in FIG. 4, and more clearly in FIG. 5, the improved modified bitumen membrane 21 has penetrated into the surface perforations 12, forming a plurality of attachment plugs 35. As will be described in more detail in connection with FIG. 7, upon installation of the improved modified bitumen membrane 21 on the perlite board 5, sufficient heat is applied to the improved modified bitumen membrane 21 to cause partial melting of the bitumen membrane, permitting a portion of the membrane to flow into the surface perforations 12, thereby, upon cooling, creating the attachment plugs 35. In contrast with the previous insulation system wherein the modified bitumen membrane was merely fused to the upper surface 9 of the perlite board, the formation of the attachment plugs 35 significantly reduces the tendency of the improved modified bitumen membrane 21 to separate from the perlite board 5.

Installation of the insulating system 31 on a roofing deck (not shown in the drawings) is accomplished by first fastening the perlite board 5 to the deck. As shown in FIG. 6, the perlite board 5 is retained in place on the deck using an attachment plate 41 that is received by and abuts the upper surface 9. The attachment plate 41 is joined to the lower supporting deck (not shown) by an attachment member 44. In the preferred embodiment, the attachment plate is fabricated out of steel, approximately 4 inches (10 cm) square, and the attachment member 44 is a self-drilling/self-tapping screw (not shown in detail) incorporating self-locking threads to prevent the attachment member 44 from backing out under wind load, vibration, or other stresses. This entire attachment system, i.e., the steel plate and the self-locking screws are marketed under the trade name "PERMAGRIP" by International Permalite, Inc.

Once the perlite board 5 has been fastened to the roof deck using a plurality of the attachment plates 41, with a frequency of one roof plate 41 for each two square feet of roof surface being sufficient for most commercial building applications, installation of the improved modified bitumen membrane 21 may then proceed. Referring to FIG. 7, it will be noted that a number of surface cracks 47 are depicted in the upper surface 9 of the perlite board 5. The surface cracks 47 illustrate the boundaries of the individual perlite boards 5, which have dimensions of two feet by four feet (0.61 m by 1.22 m) or four feet by four feet (1.22 m by 1.22 m) for most commercial applications. Once the perlite board 5 is installed on the roof deck, completion of the installation system 31 may proceed by installation of the improved modified bitumen membrane 21.

The improved modified bitumen membrane 21 is presently commercially available under the trademarks "TORCHSKIN" and "TORCHSKIN PLUS" through International Permalite, Inc., and is sold in the form of 40-inch (1 meter) -wide rolls. Thus, although installation could proceed by attaching the improved modified bitumen membrane 21 formed in pre-cut linear strips, or in tile-like squares, the preferred method of installation takes advantage of its availability in roll form. As discussed previously, upon installation, the improved modified bitumen membrane 21 is heated sufficiently so that a portion of the asphaltic composition is substantially liquid adjacent the upper surface 9 of the perlite board 5, thereby permitting a portion of the asphaltic composition to flow into the surface perforations 12, which ultimately creates the attachment plugs 35 when cool. Many sources of heat could be used to initiate this melting process of the improved modified bitumen membrane 21, however, it has been found to be advantageous to utilize a bitumen membrane applicator 51 that is informally known in the trade as a "dragon wagon." This name somehow seems appropriate for the bitumen membrane applicator 51, since it is provided with a plurality of nozzles 53, which, during operation, shoot forth flaming propane fuel provided from a fuel tank 55 supplying fuel to the applicator 51, through a fuel line 57. The improved modified bitumen membrane 21 is conveniently provided as a roll 59, and is attached to the applicator 51 utilizing an adjustable bar attachment 62 for the easy engagement/disengagement of the roll 59 to the applicator 51. The bar attachment 62 is so located as to place the bitumen roll 59 adjacent the nozzles 53, with that portion of the improved modified bitumen membrane 21 that is to be next-installed on the perlite board 5 closest to the flame nozzles 53. Movement of the bitumen applicator 51 across the surface of the installed perlite board 5 is assisted by a plurality of wheels 65. In this manner, rotation of the bitumen roll 59 as the improved modified bitumen membrane 21 is installed on the perlite board 5 complements the rotation of the wheels 65, permitting the membrane applicator 51 to easily move across the upper surface 9 of the perlite board 5. A handle 67 or other, conventional attachment structures are provided to control the movement and positioning of the membrane applicator 51. Installation of the improved modified bitumen membrane 21 thereby proceeds in an orderly manner across the upper surface 9 of the perlite board 5, with the bitumen roll 59 supplying the improved modified bitumen membrane 21 for the insulating system 31 as the membrane applicator 51 is drawn across the roof surface.

Figure 2:
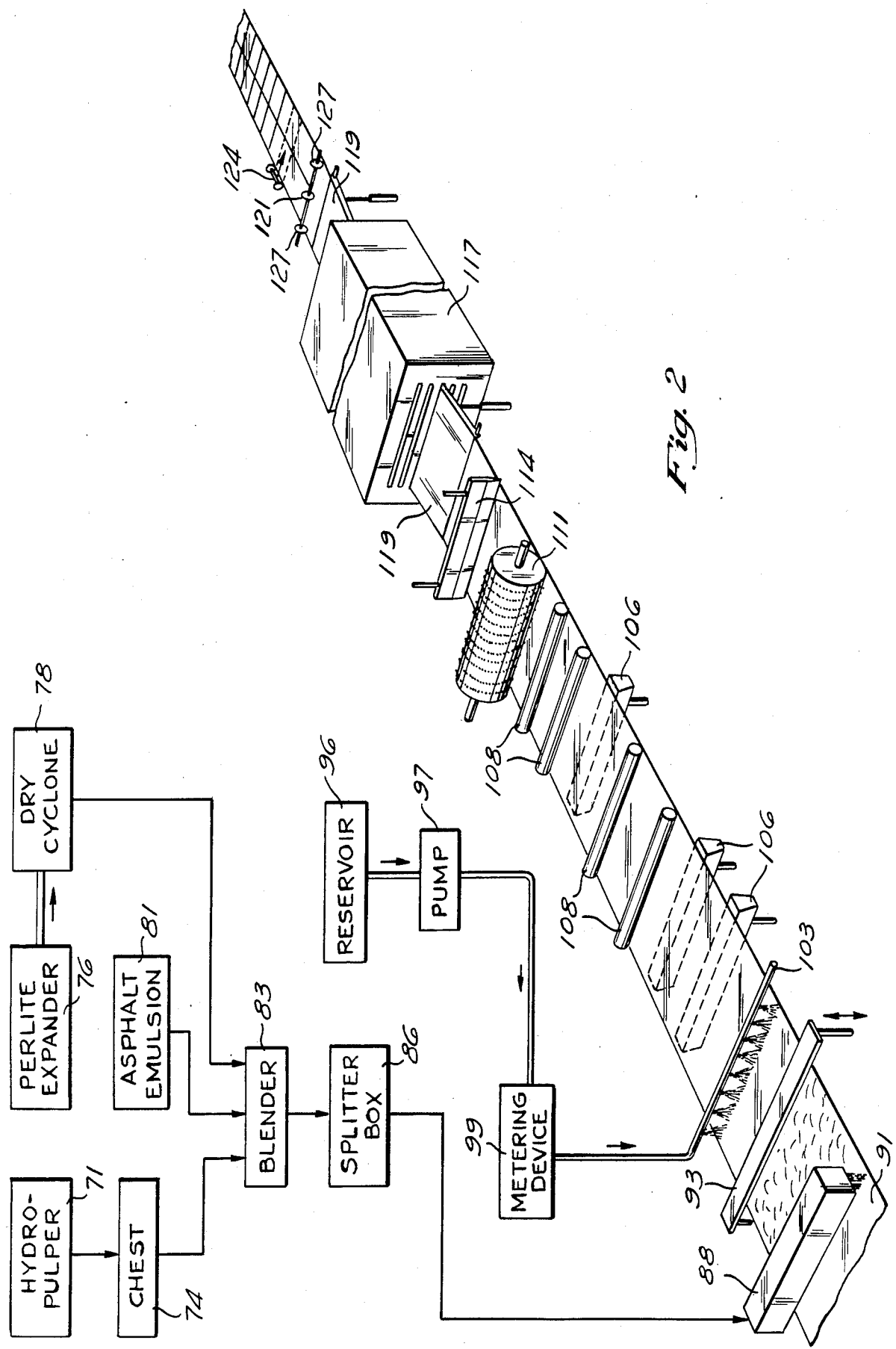
FIG. 2 is a schematic perspective view, with certain processing steps shown in block diagram, showing an assembly line for the manufacture of perlite board in accordance with the present invention.

The perlite board 5 is the principal member of the insulating system 31, and it is therefore helpful to have a general understanding of the steps required for its manufacture. Although the manufacturing process is essentially the Fourdrinier forming process, formation of the perlite board 5 in accordance with the present invention does deviate somewhat from the known manufacturing process. As schematically shown in FIG. 2 by block diagrams, the initial stage of the perlite board manufacturer involves the creation of a liquid slurry mixture. As was discussed previously, the perlite board requires the fiber binder to create the supporting structure for the expanded perlite. These fibers can be either mineral or organic, and in the preferred embodiment, the use of newsprint is deemed advantageous. A hydropulper 71 is utilized to break down the newsprint fibers into a uniform slurry-like mass. As its name implies, these conventional mechanisms utilize the mechanical mixing action of water to break down the newsprint fibers. After breaking down of the newsprint has been completed, the slurried fibers are ready for utilization in the perlite board, and are temporarily stored in a holding tank or chest 74.

As is well known, to obtain the expanded perlite particles from the perlite, it is necessary to rapidly heat the ore, vaporizing the dissolved water and causing the perlite particles to pop. A perlite expander 76 is shown in FIG. 2, and, as is conventional, the expander 76 utilizes a heated airstream flowing through the perlite ore that is to be expanded. Upon "popping", the expanded perlite is carried away in this heated airstream, and a separating or dry cyclone 78 is provided to remove the expanded perlite from the airstream.

The remaining major constituent of the perlite board slurry is an asphalt emulsion 81. Such emulsions are conventionally known, and a preferred emulsion is EA-O/Bitusize-BB-2, manufactured by Kock Asphalt Co./Chevron U.S.A., Inc. This emulsion is characterized by its waterproofing characteristic, and is kept in a storage tank (not depicted) awaiting mixture with the other perlite board constituents.

The perlite board 5, according to the present invention, has a preferred composition comprising about 50–90% expanded perlite (by weight), about 7–40% organic fiber (as binder) by weight, about 3–8% sizing agent (by weight), and about 0–2% starch (providing additional structural strength) by weight. The expanded perlite, the slurried newsprint, and the asphalt emulsion are thoroughly mixed in a blender 83, with alum (aluminum sulfate) added to precipitate the asphalt onto the perlite particles and the paper fibers. After this mixture has become well mixed, it is then ready to begin the perlite board-making process.

From the blender 83, the perlite slurry mixture is passed through a splitter box 86 wherein the single stream of slurry is separated into several streams prior to its delivery to the board-making mechanism. A head box 88 receives the multiple streams from the splitter box 86 and deposits the perlite slurry in a roughly uniform layer on a screen mat 91. The mesh of the screen mat 91 is sufficiently sized so as to prevent the solid components from passing through the screen mat 91, however permitting the passage of the slurry liquid, which is primarily water. The screen mat 91 laterally moves throughout the perlite board-making process, in much the same manner as a conveyor belt. As the screen mat 91 passes under the head box 88, a layer of the perlite slurry is deposited thereon. As indicated in FIG. 2, the surface of the slurry upon deposition is somewhat rough, and an oscillating puddler 93 is used to smooth this upper surface. The oscillating puddler 93 works upon the same principle as that used in smoothing just-poured concrete surfaces, with the surface agitation momentarily smoothing the slurry, permitting the liquids and smaller particles to seek a uniform surface.

The smoothed, slurry surface is now ready to receive the scorch-resistant coating mixture. An advantageous fire or scorch-resistant coating consists of mineral wool and clay, with a preferred composition of about 0.25–1.5% (by weight) of mineral wool and 0.25–3.0% (by weight) clay, thus resulting in a weight percentage of solids ranging from 0.5–4.5%. An appropriate mineral wool for this application is Rockwool, manufactured by Rockwool Industries/American Rockwool, and any type of low sodium/non-swelling clay is appropriate, such as that clay sold under the name CTS Clay/Green Strip by Kentucky Clays/North American Refractory. After mixing, the coating mixture is kept in a reservoir 96 with a pump 97 provided to pass the coating mixture through a conventional metering device 99 and then through a top surface applicator 103, as shown in FIG. 2. The surface applicator 103 forms a curtain of the coating mixture, which is preferably deposited at a rate of 0.15–0.35 gallons per square foot (6.1–14.3 liters/meter ) onto the top surface of the perlite slurry.

The perlite board, as a fiberboard product, is now structurally complete with respect to its constituents, and the de-watering process is now initiated. As is the case with the traditional Fourdrinier process, immediately upon deposition of the fire-resistant coating, the perlite board product is about 95% water. A vacuum is first applied to the perlite slurry from a set of vacuum boxes 106 (three are shown in FIG. 2) followed by at least one pressure roller 108 (four are shown in FIG. 2) applying pressure to the top surface of the perlite material carried on the screen mat 91. This suction and pressure treatment can be repeated a number of times, however, it has been found to be no longer efficient once the perlite slurry material approaches a concentration of greater than 20% solid materials.

After the initial de-watering, wherein the slurry is reduced to the desired thickness, the surface perforations 12 are formed in the upper surface 9 of the perlite board 5. As shown in FIG. 2, a fissure or punching roller 111 may conveniently be utilized for this purpose, and in a preferred embodiment, the punching roller 111 is approximately 36 inches (0.9 meters) in diameter, with an array of spikes projecting from the cylindrical surface to puncture the upper surface 9 as the screen mat 91 moves by underneath. Although not shown in FIG. 2, it is important to realize that this punching operation can also occur after the perlite board has completely dried, with no detrimental effect on the formation of the surface perforations 12.

The array of projecting spikes on the punching roller 111 is so designed as to punch holes into the upper surface of the perlite mat at the rate of 100–600 holes per square foot (1100–6500 per square meter) with hole dimensions preferred in the range of 1/16-⅜ inch (0.16–0.95 cm) in diameter and about ⅛"-½" (0.32–1.27 cm) in depth. Where a cylindrical punching roller 111 is used as shown in FIG. 2, the surface perforations 12 will form an approximately 90° angle $\theta$ to the upper surface 9 of the perlite board 5. However, this angle $\theta$ can vary between 10° and 90°.

Up until this point, the perlite material has comprised a continuous mass carried upon the screen mat 91. Prior to initiating the final de-watering process utilizing heated air, the initial sizing towards a commercialized product can conveniently be initiated utilizing an oscillating single blade cutter 114 that separates the perlite into individual mats. As presently designed, the screen mat 91 is substantially 8' in width (2.4 meters) and the blade cutter 114 separates the perlite material into mats having dimension of 8'×16' (2.4 by 4.9 meters).

The type of heated dryer for the remainder of the dewatering process is a matter of design choice. The intent is, of course, to maximize the utilization of the interior portions of the heated dryer as a matter of economy. A multi-deck oven 117 is depicted in FIG. 2, with a tipple conveyor system 119 on either side of the multi-deck oven 117 to obtain access to each of the oven levels. For example, as an 8'×16' mat enters the tipple conveyor system 119, the level of the conveyor system is adjusted to place that particular perlite mat in a specific oven level. Once that particular mat has been delivered to a specific oven level, the tipple conveyor system 119 moves from that level to an adjacent level, permitting the following mat to enter the adjacent oven level. This entire process will cyclically repeat itself as each of the deck levels is utilized in sequence by the tipple conveyor system 119. In a preferred system, the oven is 480' (145 meters) long with the resident time dependent upon the speed of the oven conveyor, which in turn depends upon the thickness of the perlite mat. The oven is conventionally provided with three separate temperature treatment zones, and any conventional heat source may be selected, with a gas-fired circulating oven deemed particularly advantageous.

The dried perlite board mats are then removed from the oven utilizing the tipple conveyor system 119 as previously described, and are then ready for sizing through the commercial product. Typically, a center-cut trim saw is provided to place the board in two 4'×16' sections (1.2×4.8 meters), with a lateral trim saw 124 used to cut the board into its final 2'×4' (0.6×1.2 meters) or 4'+4' (1.2×1.2 meters) commercial size. Since there are a certain number of irregularities in the perlite board along the lateral edges of the screen mat 91, the mat 91 is preferably sized to slightly exceed an 8' width (2.4 meters), and the center cut trim saw 121 is also provided with a pair of side trim saws 127 to trim the irregular edges of the perlite mat.

As constructed in accordance with the present invention, the insulating system 31 provides significant advantages over the previously utilized perlite board insulating systems. For example, in tests comparing the peel-resistance of the insulating system 31 with a similar system, but without the surface perforations 12, a measured peel strength of 2.78 pounds per inch (479 grams/cm) was obtained with the perforations and 0.49 pounds per inch (87.9 grams/cm) was obtained without the surface perforations 12. Similarly, a comparative test was made on the insulating system 31 between such a system having the improved modified bitumen membrane 21 with chopped fibers in the formulation and such a system having a conventional modified bitumen membrane. The peel strength was measured at 4.20 pounds per inch (750 grams per centimeter) for the improved modified bitumen membrane 21 system and 2.78 pounds per inch (497 grams per centimeter) for such a system utilizing the regular modified bitumen layer having no chopped fibers in the formulation.

Tests were also conducted to determine the effect of including the protective outer layer 15 in the insulating system 31. Based upon physical observations, the perlite board 5 that is provided with the protective outer layer 15 sustains only moderate charring and scorching from the bitumen membrane applicator 51. However, the standard perlite board, otherwise completely identical with the perlite board 5 in accordance with the present invention, but not having the protective outer layer 15, sustained excessive amounts of charring and scorching due to the bitumen membrane applicator 51. The insulating system 31 sold by International Permalite, Inc., under the mark "FIRESHIELD," has been subjected to F.M. (Factory Mutual Research) Class I tests and it has qualified under the F.M. Class I requirements for both wind uplift and fire-resistance.

While we have disclosed an exemplary structure to illustrate the principles of the present invention, it should be understood that we wish to embody within the scope of the patent warranted hereon, all such modifications as reasonably and properly come within the scope of our contribution to the art.

We claim:

1. A roofing insulation system comprising:
   a perlite board having an outer surface, said outer surface having a plurality of surface perforations formed therein;
   a scorch-resistant coating formed on and integral with said perforated outer surface;
   an improved bitumen membrane attached to and received by said outer coated surface, including said plurality of surface perforations,
   whereby a roofing insulation system having increased structural integrity is provided with the portions of the bitumen material received by the surface perforations increasing the peel-resistance of the insulation system.

2. An expanded perlite insulation system comprising:
   an expanded perlite board having a first surface and a second surface, said first surface having a plurality of surface perforations and said second surface received by an insulation supporting structure when said perlite insulation system is mounted within a building structure;

an outer bitumen membrane received by and attached to said first surface of the expanded perlite board, with a plug of said outer bitumen membrane formed in each of said surface perforations; and a scorch-resistant coating integrally formed on said first surface, said scorch-resistant coating receiving said outer bitumen membrane, whereby the peel-resistance of the outer bitumen membrane with respect to the perlite board is enhanced by the formation of the plurality of bitumen plugs received within the perlite board.

3. An expanded perlite insulation systems comprising:

an expanded perlite board having a first surface and a second surface, said first surface having a plurality of surface perforations and said second surface received by an insulation supporting structure when said perlite insulation system is mounted within a building structure;

an outer bitumen membrane received by and attached to said first surface of the expanded perlite board, with a plug of said outer bitumen membrane formed in each of said surface perforations; and a scorch-resistant coating comprising an admixture of mineral wool and clay integrally formed on said first surface, said scorch-resistant coating receiving said outer bitumen membrane, whereby the peel-resistance of the outer bitumen membrane with respect to the perlite board is enhanced by the formation of the plurality of bitumen membrane plugs received within the perlite board.

4. An improved perlite board insulating system of the type having a modified bitumen membrane received by a planar surface of an expanded perlite insulation board, wherein the improvement comprises:

said planar surface having a plurality of surface perforations formed therein, said surface perforations receiving a portion of the modified bitumen membrane with a bitumen plug formed within each of said surface perforations; and a scorch-resistant layer integrally formed on said planar surface and receiving said bitumen membrane.

* * * * *